May 2, 1950          A. T. GREGORY          2,505,856
GEARING FOR INTERNAL-COMBUSTION ENGINES
Filed Nov. 27, 1944          2 Sheets-Sheet 1
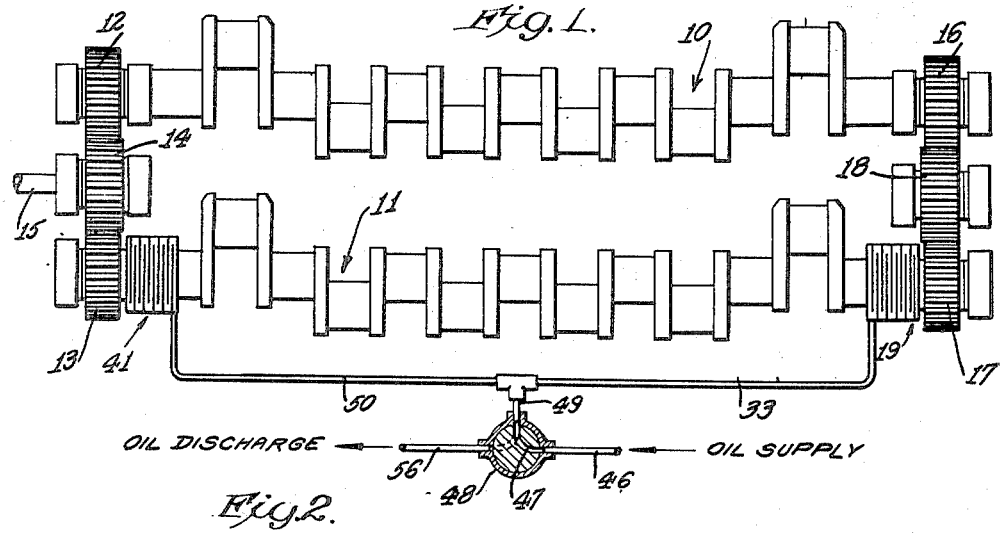
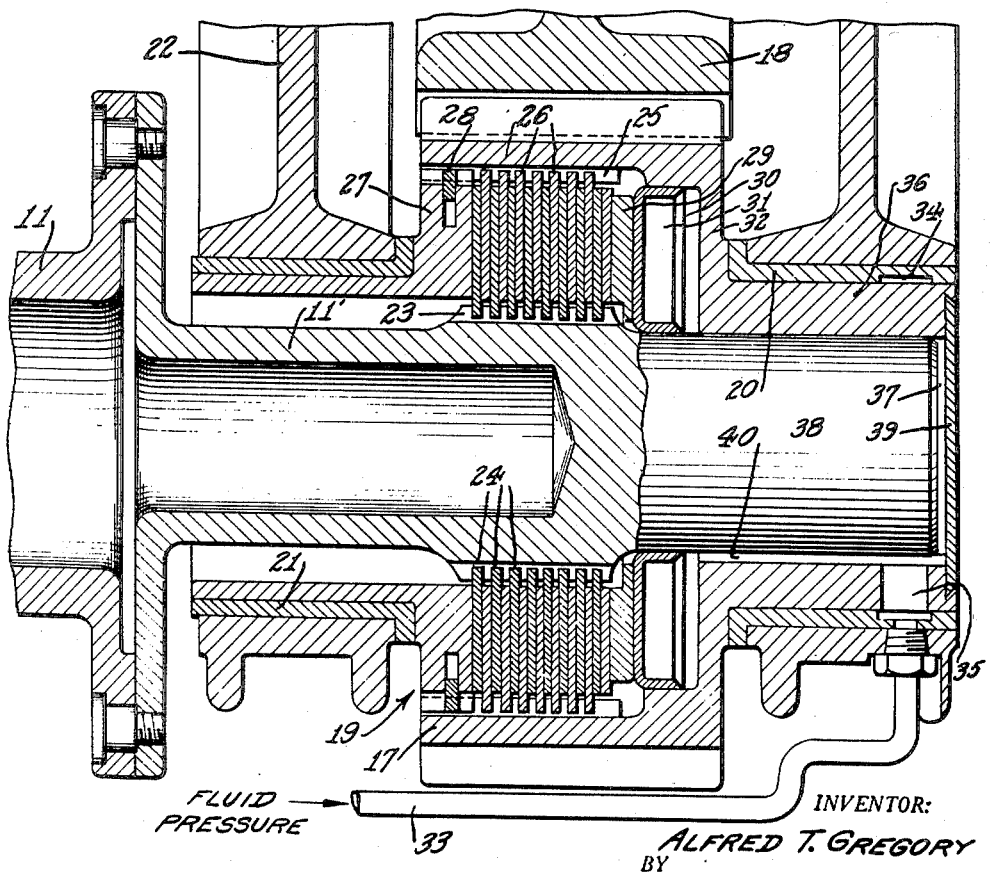
INVENTOR:
ALFRED T. GREGORY
BY
ATTORNEYS May 2, 1950     A. T. GREGORY     2,505,856
GEARING FOR INTERNAL-COMBUSTION ENGINES
Filed Nov. 27, 1944     2 Sheets-Sheet 2

FLUID PRESSURE

INVENTOR:
ALFRED T. GREGORY
BY
ATTORNEYS

Patented May 2, 1950

2,505,856

UNITED STATES PATENT OFFICE 2,505,856

GEARING FOR INTERNAL-COMBUSTION ENGINES

Alfred T. Gregory, Massapequa, N. Y., assignor to Fairchild Engine and Airplane Corporation, Farmingdale, N. Y., a corporation of Maryland Application November 27, 1944, Serial No. 565,233

10 Claims. (Cl. 74—410)

This invention relates generally to internal combustion engines, and has particular reference to a coupling mechanism for the crankshafts of a dual crankshaft engine, or two engines operating side-by-side and adapted to jointly drive common output shafting, such as one or more airplane propeller shafts, although the invention is not limited to such use.

In order to increase the output of a power plant it has been proposed either to operate simultaneously two engines as a single unit or to provide two or more separate complete engine cylinder groups for operating corresponding crankshafts. In order that the maximum common output for both engine units may be obtained with minimum crankcase loads, it is necessary that the two crankshafts operate in synchronism at the proper phase relationship. In order to attain that end the crankshafts are positively geared together at the output or propeller ends thereof, even when driving two counter-rotating propellers. The combination of the two crankshafts geared together and driving one or two propellers provides many degrees of freedom for torsional vibration. Particularly, the two crankshafts can vibrate together with in-phase and out-of-phase vibration with one or more nodal points for each mode of vibration and at any of a large number of orders. The vibrations of the crankshafts may be reduced by one or more of the usual dynamic type dampers tuned to the orders of vibration, although it may be advantageous to use other means. In a dual crankshaft engine, it is desirable to provide a means for gearing the two crankshafts together at the anti-propeller end through a friction clutch, for absorbing the differential vibrations between the shafts.

In accordance with the present invention, a dual crankshaft engine is provided in which the aforementioned desirable characteristics are attained without the addition of parts materially increasing the size or weight of the engine, and in many instances making possible the elimination of heavy and expensive parts.

In its preferred embodiment as applied to a dual crankshaft engine in which the crankshafts are geared together at their output or propeller ends, the invention comprises gearing connecting the crankshafts together at their other or anti-propeller ends, with a friction coupling interposed between the anti-propeller end of one of said crankshafts and said gearing and arranged to slip during relative movement between said crankshafts at that end. Inasmuch as such relative movement is usually caused by torsional vibrations, the slip coupling functions as a vibration absorber and as such will make other types of vibration dampers unnecessary in many instances. In an engine in which the two crankshafts rotate in the same direction, the slip coupling will absorb the out-of-phase vibrations. By suitable selection of firing order and crankshaft phase relationship the number and magnitudes of the in-phase vibration orders remaining to be damped by means of additional dampers can be reduced to a minimum. Conversely, if the two crankshafts rotate in opposite directions, the friction coupling will absorb the inphase vibration of the two shafts. Suitable firing orders and shaft phase relationship would thus be chosen to obtain the minimum number and magnitude of out-of-phase vibration orders requiring additional damping.

The slip coupling may also be arranged to operate as a slip clutch for clutching and declutching the corresponding crankshaft from the other, in cooperation with another clutch and synchronizing device at the propeller end of the same crankshaft, for enabling that crankshaft to be rendered active or inactive at will, so that the engine operates on one or both crankshaft-cylinder groups. In such combination the slip coupling is engaged and disengaged simultaneously with the main synchronizing clutch mechanism and to that end both the slip coupling and the mechanism may be hydraulically engaged and disengaged by means of a common operating member, such as a valve.

It will be seen that the engine crankshaft coupling arrangement of this invention provides a very simple and effective means for absorbing out-of-phase vibration between the two crankshafts.

For a more complete understanding of the invention, reference may be had to the accompanying drawing, in which:

Figure 1 illustrates diagrammatically two crankshafts connected together at their opposite ends with a clutch interposed in the connection at each end of one of the crankshafts;

Fig. 2 is an axial section through the clutch at the anti-propeller end of the crankshaft combination;

Figure 3:
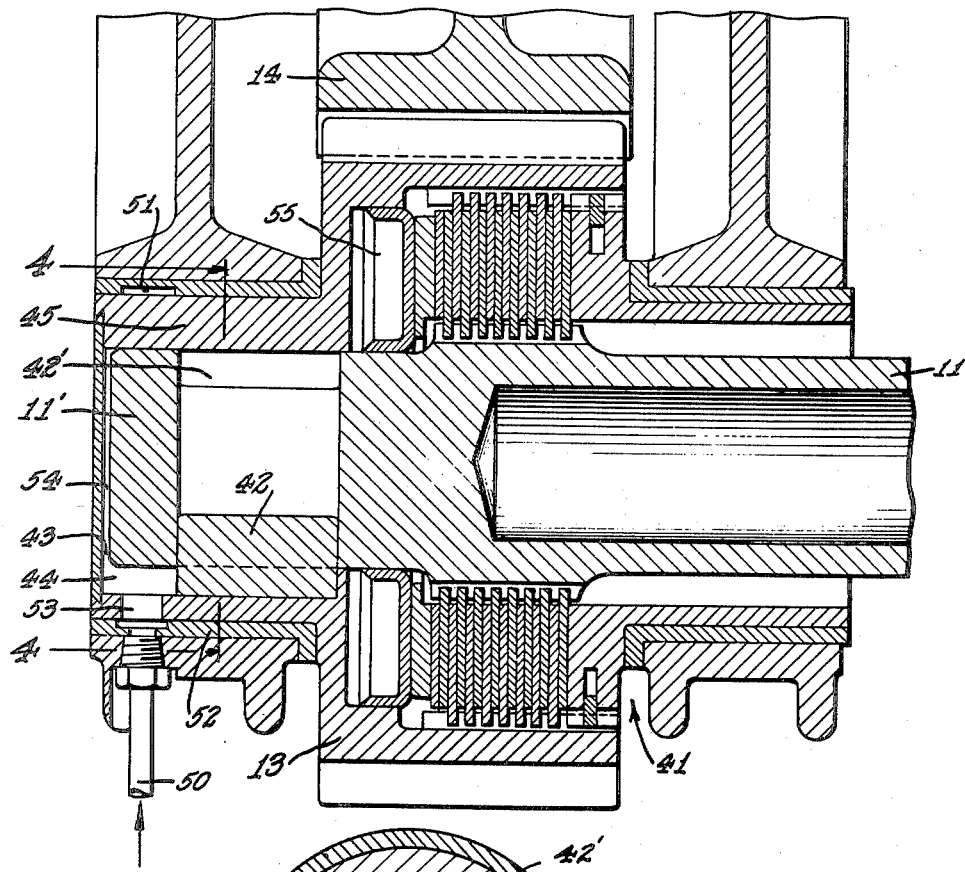
Fig. 3 is an axial section through the clutch at the propeller end of the crankshaft combination.

Referring to Fig. 1, numeral 10 designates a crankshaft of an internal combustion engine such as an aeronautical engine, which may be of the inline inverted type, for example. The engine is constructed so that one group of cylinders acting as a separate engine drives crankshaft 10, and a second group of cylinders acting as a separate second engine drives crankshaft 11. Crankshafts 10 and 11 are arranged in parallel relation, preferably in the manner illustrated in greater detail in copending application Serial No. 520,040, filed January 28, 1944, by applicant and C. C. De Pew, now forfeited, and refiled December 29, 1948, as a continuation, Serial No. 67,958.

Crankshaft 10 is provided at the propeller end thereof with a spur pinion 12 and crankshaft 11 is provided at the propeller end thereof with a similar spur pinion 13. Pinions 12 and 13 mesh with gear 14 keyed to the propeller shaft 15. In the arrangement shown, pinions 12 and 13 and propeller gear 14 are of the same diameter so that the drive is at a one-to-one ratio, but reduction gearing may be provided between propeller shaft 15 and the propeller, not shown.

Crankshafts 10 and 11 are also connected together at their anti-propeller ends, crankshaft 10 having a spur pinion 16 and crankshaft 11 a spur pinion 17 keyed thereon, both of which engage idler spur gear 18. Accordingly, when both engines or cylinder groups are operating, corresponding crankshafts 10 and 11 are in operation and rotate in synchronism, being geared together at each end.

In order to absorb differential vibrations between the two crankshafts, and to make tuned vibration dampers unnecessary in many cases, there is interposed between the two crankshafts a slip coupling designated 19 in Fig. 1 and shown in greater detail in Fig. 2. The slip coupling 19 is designed to slip in response to relative motion between the crankshafts 10 and 11, such as that which is caused by torsional vibration in one of the crankshafts or out of phase torsional vibrations simultaneously occurring in both crankshafts, and the like. A friction plate clutch, which would provide Coulomb damping, is proposed as a most effective or practical type of coupling.

As shown in Fig. 2, the pinion 17 at the antipropeller end of crankshaft 11 is journalled in bearings 20 and 21, suitably mounted in the frame 22 of the engine. The quill 11' of crankshaft 11 is fitted with axial splines 23 upon which are slidable axially but not circumferentially spaced friction discs 24 which may be eight in number, as shown. The interior of the pinion 17 is also fitted with axial splines 25 on which are slidable axially but not circumferentially the eight complementary friction discs 26 which fit between the discs 24 connected to the crankshaft quill 11'.

Also mounted on internal spline 25 of pinion 17 so as to rotate therewith in bearing 21 is an axially fixed retaining plate 27 held in place by snap ring 28, against which the interleaved friction discs 24 and 25 abut at one end. Engaging the other end of the friction discs 24 and 25 is a presser plate 29 which is slidable axially within the annular space formed between the interior of pinion 17 and the exterior of quill 11', and containing the annular piston 30 engaging presser plate 29. The opposite side of piston 30 is recessed and forms pressure chamber 31 with the flange 32 of pinion 17, as shown.

A source of fluid under relatively contant pressure when the engine is operating is connected to pipe 33 leading to an annular groove 34 in bearing 20 communicating through radial passage 35 in the hub 36 of pinion 17 with the chamber 37 between the end 38 of quill 11' and cap plate 39 closing the open end of the hub 36. A slot 40 on the surface of gear hub 36 connects chamber 37 with chamber 31, so that the pressure fluid normally urges piston 30 to the left, as seen in Fig. 2, to force presser plate 29 against the stack of friction discs 24 and 26 to cause pinion 17 to be frictionally coupled to quill 11' and in turn to the crankshaft 11.

In operation the two crankshafts 10 and 11 are geared together at their opposite ends and consequently rotate together, both furnishing power to propeller shaft 15 or other driven element. Oil under pressure is supplied at all times to clutch chamber 31 so that the discs 24, 26 of coupling clutch 19 are continuously in frictional engagement during operation of the enfine. However, the coupling clutch 19 slips in response to relative motion between the two crankshafts 10 and 11 and consequently acts as a torsional vibration damper to eliminate or reduce differential torsional vibration between the two crankshafts at the anti-propeller end. Accordingly, coupling clutch 19 in many cases obviates the need of special damping means in the crankshaft system, particularly if the crankshaft operating speeds, cylinder firing order, and relative crankshaft angularity are well chosen.

The present invention is also adaptable without change to dual crankshaft operation, providing for connection and disconnection of one of the crankshafts to the other at will, such as is described, for example, in said copending joint application. In such organization, clutch 19 cooperates with a self-synchronizing clutch 41 interposed between the crankshafts at the propeller end of the engine opposite coupling clutch 19. Preferably, self-synchronizing clutch 41 is positioned on the same crankshaft as that having coupling clutch 19, namely, crankshaft 11 in the embodiment shown. Clutch 41 is shown in detail in Fig. 3 and the clutch portion thereof is constructed like that of coupling 19, and hence need not be further described.

Figure 4:
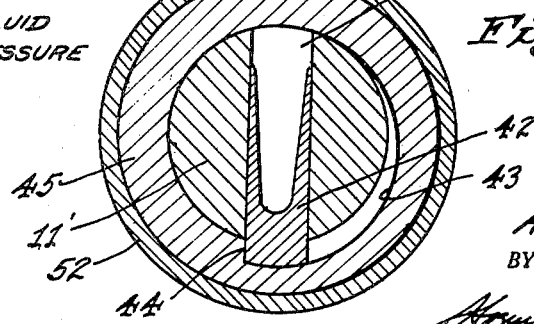
Fig. 4 is a view in section taken on line 4—4 of Fig. 3.

The self-synchronizing mechanism of clutch 41 operates by centrifugal force, and includes a dog 42 slidable in diametral slot 42' in the end 44 of the quill 11'' of crankshaft 11. As shown particularly by Fig. 4, the free or outer end of the dog 42 is adapted to be forced by centrifugal force into engagement with an annular spiral cam 43 ending in a positive stop 44 on the inner surface of hub 45 of gear 13. Stop 44 and dog 42 are so located as to provide the proper annular relationship between the two crankshafts 10 and 11.

Oil under pressure from a suitable source is supplied by pipe 46 through passage 47 of twoway valve 48, which communicates with pipe 49 leading to pipes 33 and 50, the former leading to coupling clutch 19 and the latter to self-synchronizing clutch 41, as shown in Fig. 1. Supply pipe 50 is connected to clutch 41 in the same general way as pipe 33 is connected to clutch 19, the former leading to annular groove 51 in bearing 52 communicating through radial passage 53 in hub 45 of gear 13 with space 54, which in turn communicates with pressure chamber 55 of clutch 41, so that the clutch is engaged in the same manner as described in connection with coupling clutch 19. When valve 48 is turned to connect pipe 49 with oil discharge pipe 56 through valve passage 47, the pressure on both clutches 19 and 41 is simultaneously relieved and they are disengaged.

In operation of the double clutch arrangement shown in Fig. 1, and assuming that only crankshaft 10 is operating while crankshaft 11 is inoperative with clutches disengaged, if the pilot or other operator desires to place the other crankshaft 11 into synchronous operation with crankshaft 10, he manipulates valve 48 so as to place oil supply pipe 46 in communication with pipes 33 and 50, thereby engaging clutches 19 and 41, respectively, in the manner described. The operator, using the crankshaft 10 combination to start crankshaft 11 combination, supplies fuel and closes the ignition switch to the latter. As the crankshaft 11 combination does not initially develop torque or speed equal to that of the crankshaft 10 combination, the clutches 19 and 41 slip, until the speed developed by crankshaft 11 combination attains that of crankshaft 10 combination, when dog 42 engages stop 44, whereupon the crankshafts are positively coupled together.

At the anti-propeller end, however, the coupling clutch 19 will continue to slip whenever relative motion occurs between the two crankshafts 10 and 11 at that end. Clutch 19 accordingly acts as a vibration absorber in the manner previously described, even though in combination with self-synchronism clutch 41. It is accordingly adaptable to both arrangements described.

While certain preferred embodiments of the invention have been illustrated and described herein, it is to be understood that the invention is not limited thereby but is susceptible of changes in form and detail within the scope of the appended claims.

I claim:

1. In an internal combustion engine having two separately driven crankshafts, and means connecting said crankshafts together at one end, the combination of means connecting the other ends of said crankshafts, a slip clutch interposed in each of said connecting means, and a second clutch at one end for positively connecting said crankshafts together so as to maintain synchronism and the proper phase relationship between them, said slip clutch at the other end being adapted to slip in response to relative movement between said crankshafts.

2. An internal combustion engine having two separately driven crankshafts, means including releasable power transmitting means connecting said crankshafts together at one end, means connecting the other ends of said crankshafts, said means including gearing, and a releasable slip coupling in said gearing for absorbing relative movement between said crankshafts.

3. An internal combustion engine having two separately driven crankshafts, means including a releasable clutch connecting said crankshafts together at one end, means connecting the other ends of said crankshafts, said means including gearing, and a releasable friction clutch between said gearing and one of said crankshafts for connecting and disconnecting said crankshafts and absorbing vibration therebetween.

4. An internal combustion engine having two separately driven crankshafts, means including releasable power transmitting means connecting said crankshafts together at one end, means connecting the other ends of said crankshafts, said means including gearing and a friction member connected to and rotatable with one of said crankshafts and a cooperating friction member connected to the gearing and rotatable therewith, and fluid pressure means normally urging said members into frictional engagement, whereby a slip coupling is provided for absorbing relative movement between said crankshafts at that end.

5. An internal combustion engine having two separately driven crankshafts, means including releasable power transmitting means connecting said crankshafts together at one end, means connecting the other ends of said crankshafts, said means including gearing and a friction member connected to and rotatable with one of said crankshafts and a cooperating friction member connected to the gearing and rotatable therewith, means normally urging said members into frictional engagement, whereby a slip coupling is provided for absorbing relative movement between said crankshafts at that end, and means for disabling said last-named means at will to disconnect said crankshafts at that end.

6. An internal combustion engine having two separately driven crankshafts, means including releasable power transmitting means connecting said crankshafts together at one end, means connecting the other ends of said crankshafts, said means including gearing and a friction member connected to and rotatable with one of said crankshafts and a cooperating friction member connected to the gearing, fluid pressure means normally urging said members into frictional engagement, whereby a slip coupling is provided for absorbing relative movement between said crankshafts at that end, and means for disabling said last-named means at will to disconnect said crankshafts at that end.

7. An internal combustion engine having two separately driven crankshafts, and means connecting said crankshafts together at one end, means connecting the other ends of said crankshafts, a slip clutch interposed in each of said connecting means, and means for simultaneously engaging and disengaging both of said clutches at will.

8. In an internal combustion engine having two separately driven crankshafts, and means connecting said crankshafts together at one end, the combination of means connecting the other ends of said crankshafts, a slip clutch interposed in each of said connecting means, a source of a fluid pressure connected to each clutch for normally holding them in engagement to connect said crankshafts together, and a valve in said last connection for simultaneously connecting and disconnecting said source to said clutches at will to engage and release said clutches.

9. In an internal combustion engine having two separate crankshafts, gearing connecting said crankshafts together at their corresponding ends, a friction clutch interposed between said gearing and each end of one of said crankshafts, and means for simultaneously engaging and releasing said clutches at will.

10. In an internal combustion engine having two separately driven crankshafts, the combination of gearing and a clutch connecting said crankshafts together at one end, a driven shaft, a gear connecting the other end of each of said crankshafts to said driven shaft for jointly driving the latter, and a frictional damping means interposed in said last-named connections between the corresponding gear and crankshaft, said damping means including a hydraulic frictional resistance coupling affording relative rotative movement between said corresponding gear and crankshaft in response to out-of-phase vibration between said two crankshafts to thereby absorb the same.

ALFRED T. GREGORY.

REFERENCES CITED

The following references are of record in the file of this patent:

UNITED STATES PATENTS

| Number | Name | Date |
| --- | --- | --- |
| 1,088,241 | Royce | Feb. 24, 1914 |
| 1,701,403 | Coykendall | Feb. 5, 1929 |
| 1,738,251 | Kasley | Dec. 3, 1929 |
| 1,824,700 | Williamson | Sept. 22, 1931 |
| 1,854,238 | Thompson | Apr. 19, 1932 |
| 2,108,165 | Criley | Feb. 15, 1938 |
| 2,283,606 | Lewis | May 19, 1942 |
| 2,350,377 | Tjaarda | June 6, 1944 |
| 2,389,778 | Fedder et al. | Nov. 27, 1945 |
| 2,407,114 | Tyler et al. | Sept. 3, 1946 |